United States Patent [19]

Lucas

[11] 3,950,199

[45] Apr. 13, 1976

[54] BOTTLE COATING METHOD
[75] Inventor: Howard R. Lucas, Toledo, Ohio
[73] Assignee: Owens-Illinois, Inc., Toledo, Ohio
[22] Filed: Mar. 15, 1974
[21] Appl. No.: 451,574

[52] U.S. Cl. ............... 156/86; 118/413; 118/416; 215/DIG. 6; 427/286; 427/287; 427/358; 427/401; 427/430
[51] Int. Cl.² . B29C 27/24; B05D 1/26; B05D 1/40; B05D 3/12
[58] Field of Search ............ 117/94; 101/38, 39, 40; 118/409, 410, 411, 413, 416, 320, 232; 215/12 R, DIG. 6; 156/542, 557, 86; 427/430, 358, 286, 287

[56] References Cited
UNITED STATES PATENTS

| | | | |
|---|---|---|---|
| 1,324,295 | 12/1919 | Bawtree | 118/232 X |
| 2,132,868 | 10/1938 | Denelsbeck | 101/38 R X |
| 2,195,671 | 4/1940 | Ferngren | 427/430 X |
| 2,721,516 | 10/1955 | Campbell et al. | 101/407 R |
| 2,721,535 | 10/1955 | Zitkus | 118/320 X |
| 2,739,531 | 3/1956 | Hagerman | 101/126 |
| 3,212,915 | 10/1965 | Hackett et al. | 215/DIG. 6 |
| 3,241,518 | 3/1966 | Johnson | 117/94 X |
| 3,348,520 | 10/1967 | Lockwood | 118/411 X |
| 3,376,848 | 4/1968 | Relyea et al. | 118/320 X |
| 3,483,063 | 12/1969 | Baines et al. | 156/542 X |
| 3,542,229 | 11/1970 | Beyerlein et al. | 215/12 R X |
| 3,604,584 | 9/1971 | Shank | 215/DIG. 6 |
| 3,698,586 | 10/1972 | Terner | 215/DIG. 6 |
| 3,720,162 | 3/1973 | James | 101/39 |
| 3,760,968 | 9/1973 | Amberg et al. | 215/12 R |
| 3,761,300 | 9/1973 | Huffman et al. | 117/38 |

FOREIGN PATENTS OR APPLICATIONS 853,505  3/1940  France ............... 118/409

*Primary Examiner*—Ronald H. Smith
*Assistant Examiner*—Stuart D. Frenkel
*Attorney, Agent, or Firm*—Steve M. McLary; Edward J. Holler

[57] ABSTRACT

Method and apparatus for providing a completely encircling coating of an organic polymeric material on a localized region of a glass container. At a coating station, a glass container is rotated through at least 360°. During the rotation, a material application head furnishes fluid organic polymeric material to the surface of the localized region of the glass container which is to be coated. Stop members hold the application head a fixed distance from the localized region and a doctoring edge of the application head helps form a uniform layer or coating of the organic polymeric material completely encircling the localized region.

4 Claims, 9 Drawing Figures

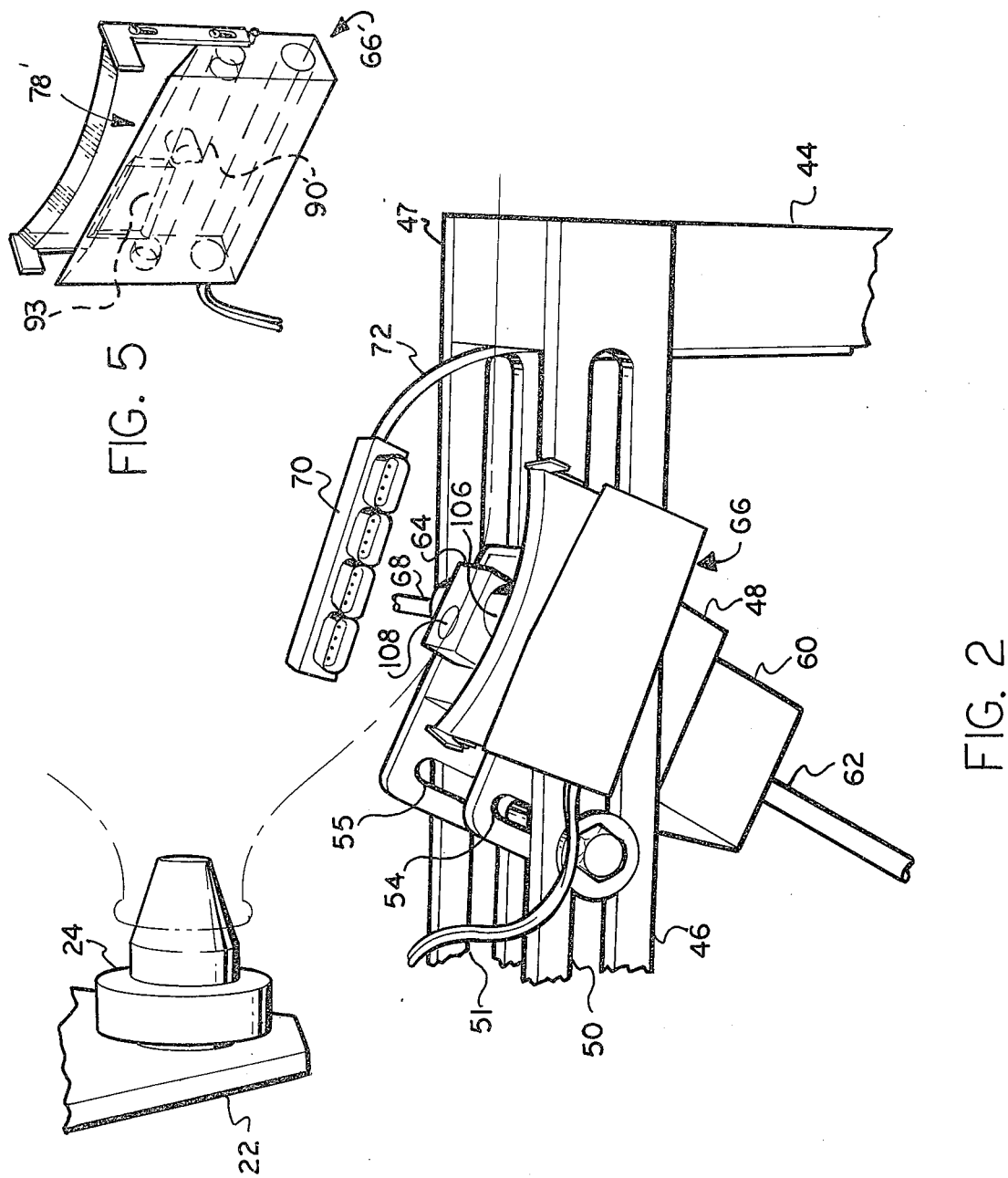

3,950,199

BOTTLE COATING METHOD

BACKGROUND OF THE INVENTION

This invention generally relates to the coating of glass containers. More particularly, this invention relates to the application of organic polymeric material coatings to glass containers. Specifically, this invention relates to an apparatus and method for completely encircling a localized region of a glass container with a coating or layer of an organic polymeric material.

The inherent strength of glass containers is well known. However, much of this strength may be lost due to surface abrasions during the service life of such a container. U.S. Pat. No. 3,760,968 shows a sleeve-like cover which in one form provides a sleeve covering for the main body portion of a glass container, thereby protecting at least this portion from surface abrasions. I have developed an improved method and apparatus for providing an improved coating on the shoulder and/or neck portion of a glass container to protect these areas from abrasions. Thus, a container with a shoulder or neck so coated may have a sleeve shown in U.S. Pat. No. 3,760,968 subsequently applied to thereby produce a glass container which has substantially its entire surface area protected from abrasion.

SUMMARY OF THE INVENTION

My invention is a method and apparatus for completely encircling a localized region of a glass container with an organic polymeric material. The apparatus includes means for presenting glass containers one at a time to a coating station; means for rotating the glass containers at the coating station; a material application head, located at the coating station; a source of fluid organic polymeric material connected to the application head; and means for moving the application head into and out of engagement with that region of the glass container to be coated while the glass container is at the coating station and while the glass container is rotated through at least 360°.

BRIEF DESCRIPTION OF THE DRAWINGS

FIG. 2 is a perspective view of a portion of the coating station shown in FIG. 1;

FIG. 5 is a perspective view of a modified material application head for the present invention;

DETAILED DESCRIPTION OF THE DRAWINGS

Figure 1:
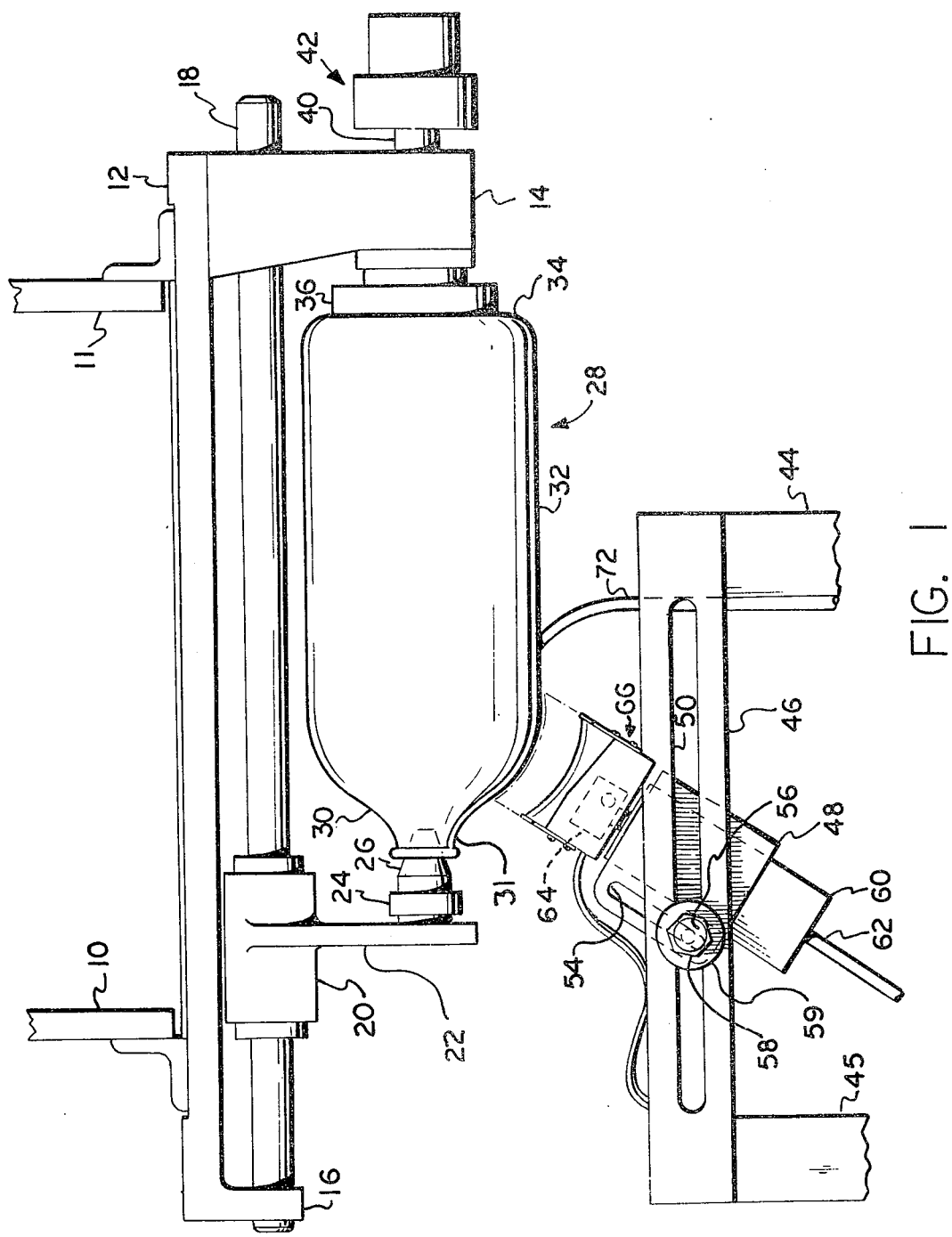
FIG. 1 is a side elevational view of the coating station of the present invention.

FIG. 1 illustrates a portion of a machine of the general type illustrated in U.S. Pat. No. 739,531, the teachings of which are hereby incorporated by reference, which has been slightly modified to allow practice of the present invention. In the machine of the type described, glass containers are loaded into a rotary turret-type mechanism which revolves the glass containers in an intermittent fashion from station to station, one station allowing coating of the glass container. The modification required to practice the present invention has been one which allows access to the glass containers at a lower point in the revolution of the rotary turret rather than access at the top of the turret revolution cycle as shown in the cited patent. Many other types of mechanisms could also be used to practice the present invention, with the necessary modifications to allow access to the lower portion of the glass container. Examples of such machines may be seen in U.S. Pat. Nos. 2,721,516 or 2,231,535. With specific reference now to FIG. 1, two spider arms 10 and 11 connect a main carrier bar 12 to an intermittent rotary-type mechanism, which is not shown in FIG. 1. It is this mechanism which is explained in detail in U.S. Pat. No. 2,739,531. There are actually a plurality of such spider arms 10 and 11 spaced about the periphery of the rotary mechanism so that at any one time a plurality of main carrier bars 12 are available to carry glass containers. Connected to the main carrier bar is a downwardly extending rod support 14. A second rod support 16 is attached to the opposite end of the main carrier bar 12. A rod 18 is engaged in holes that are formed in the two rod supports 14 and 16 and extends between the two rod supports 14 and 16. The rod 18 may be slidably mounted within the holes in the rod supports 14 and 16 for movement back and forth by cam actuation. Fixed to the rod 18 is a neck chuck carrier 20. The neck chuck carrier 20 has a downwardly depending chuck support portion 22. A neck chuck 24 is rotatably mounted on the chuck support portion 22. The neck chuck 24 has a tapered plug portion 26 which is designed to enter the neck opening in a glass container 28. The glass container 28 includes a shoulder portion 30, a neck portion 31 which merges with the shoulder portion 30, a substantially cylindrical main body portion 32, and a bottom portion 34. Rotatably mounted on the rod support 14 near the lower end thereof is a bottom chuck member 36. It may thus be seen in FIG. 1 that the glass container 28 is engaged by the tapering portion 26 of the neck chuck 24 and the bottom chuck 36 and is thus rotatably suspended. Therefore, rotation of the bottom chuck 36 and the neck chuck 24 will allow all surfaces of the glass container 28 to be presented at a fixed point. The bottom chuck 36 is mounted on a shaft 40 which is connected to a clutch unit 42. As described in the previously cited patent, clutch unit 42 will be engaged to a drive source, not shown, at a station at which it is desired to rotate the glass container 28 and will cause the glass container 28 to be rotated about its longitudinal axis. In the illustration in FIG. 1, the longitudinal or extended axis of the glass container 28 is oriented in a substantially horizontal plane. However, the present invention may be practiced with the container 28 in other positions, for example vertical rather than horizontal. Positioned below the glass container 28 and terminating out of the path of travel of the glass container 28 are two column members 44 and 45, both of which are attached to the structure of the entire machine in a fashion that is not shown. Extending between the column members 44 and 45 are two cross bar members 46 and 47, only the member 46 being visible in FIG. 1. The cross bar members 46 and 47 are attached to the column members 44 and 45 and are horizontally spaced apart. A generally U-shaped clamp member 48 is positioned between the cross bar members 46 and 47 in a fashion best seen with respect to FIG. 2. Each of the cross bar members 46 and 47 have elongated slots, respectively designated as 50 and 51, formed therein. The clamp member 48 has two substantially identical elongated slots 54 and 55 formed near the upper edges of the legs thereof. A threaded bolt 56 extends through all the slots 50, 51, 54 and 55. A nut 58 and a washer 59 are used to secure the clamp member 48 at any desired position by tightening against the cross bar members 46 and 47. This tightening function is used to secure a fluid motor 60, carried by the clamp member 48, in a desired attitude with respect to the glass container 28. As is evident in FIG. 1, the fluid motor 60 is of the type which has a substantially rectangular or square-shaped body. The fluid motor 60 is of the conventional and well-known type which has within it a sliding piston and an extensible operating rod, which is not visible in FIG. 1. The fluid motor 60 is spring-loaded so that the operating rod is normally maintained in a retracted position. When an operating fluid, such as air, is introduced into the fluid motor 60 through an inlet line 62, the operating rod is extended. The operating rod carries on its extensible end a small mounting block 64. Attached to the mounting block is a material application head 66. The application head 66 is shown in more detail in FIG. 3 and will be described with reference to FIG. 3. When the operating rod of the fluid motor 60 is extended, the application head 66 is moved from the solid line position as shown in FIG. 1 to the dotted line position shown in FIG. 1 which is adjacent to the surface of the glass container 28. A fluid organic polymeric material is supplied to the application head 66 through a pipe line, which is best seen with reference to FIG. 2, and therefore when the application head 66 is brought into near contact with the glass container 28, a film of organic polymeric material is applied to a localized region of the glass container 28 as the glass container 28 is rotated. The material is flowed onto the container 28 from the head 66, with the head 66 serving as a reservoir for the fluid organic polymeric material. This film results from the organic polymeric material adhering to the glass container 28 and being fed from the application head 66 as the glass container 28 is rotated. For the purposes of illustrating one specific embodiment of this invention, the coating will be described with respect to coating the shoulder portion 30 of the glass container 28. However, the present apparatus with appropriate modifications to the contour of the application head 66 could also coat the neck portion 31. In addition, if desired, part of the main body portion 32 could also be coated. In general, this invention will completely encircle a localized region of a glass container with a film or a layer of organic polymeric material.

The perspective view of FIG. 2 is included to allow a clear view of the mounting of the application head 66. Note that because of the angle from which the view of FIG. 2 is taken, the mounting block 64 appears to be above the top of the application head 66. This is not true, as may be seen with respect to FIG. 1, wherein the phantom line position of the mounting block 64 shows its correct position which is below the top of the application head 66. A feed line 68 supplies a fluid organic polymeric material to the mounting block 64. The fluid polymeric material is preferably molten ethylene acrylic acid, but may be any readily meltable thermoplastic material which can form a film in a solidifed state or any thermosetting material in a fluid form which can likewise form such a film. An example of another material which could be used is molten polyethylene. In addition, liquid plastic material such as plastisol could also be used. Thus, the most general term which can be used in that of a fluid organic polymeric material, since the practice of this invention does require the material to be in its fluid state. A solid pipe connection then transports the fluid organic polymeric material through the mounting block 64 and into the application head 66. The infeed line 68 is preferably a flexible line which allows movement. Thus, as the mounting block 64 is moved as a result of the extension of the operating rod, the flexible infeed line 68 may move, but the material application head 66 is held in a relatively fixed position until it nearly contacts the shoulder portion 30 of the glass container 28. A gas burner 70, which was not visible in FIG. 1, is supported in position by its gas inlet line 72. When the application head 66 is brought into proximity to the shoulder portion 30, a film of the fluid organic polymeric material is deposited on the shoulder of the glass container 28. In the preferred embodiment, this material is a molten thermoplastic material. Thus, when the material application head 66 is retracted to allow the glass container 28 to move to the next station, there is a tendency for strings of the molten material to be formed between the material application head 66 and the coated shoulder portion 30. Flame from the gas burner 70 is directed so that it just brushes the shoulder portion 30 of the glass container 28 and thus quickly melts and severs off any strings of the molten thermoplastic material which have a tendency to be formed during this process. The coating process is extremely quick, normally requiring less than one-half second, and thus the flame from the gas burner 70 does not have sufficient time to scorch or degrade the coating placed on the shoulder 30 of the glass container 28, but does not have sufficient time to melt and sever any small threads of the material which tend to be formed during the retraction of the material application head 66.

Figure 4:
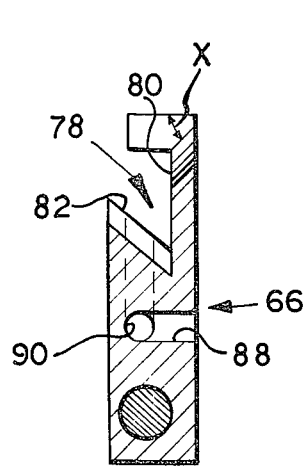
FIG. 4 is a cross-sectional view of the material application head of the present invention taken along line 4—4 in FIG. 3.
Figure 3:
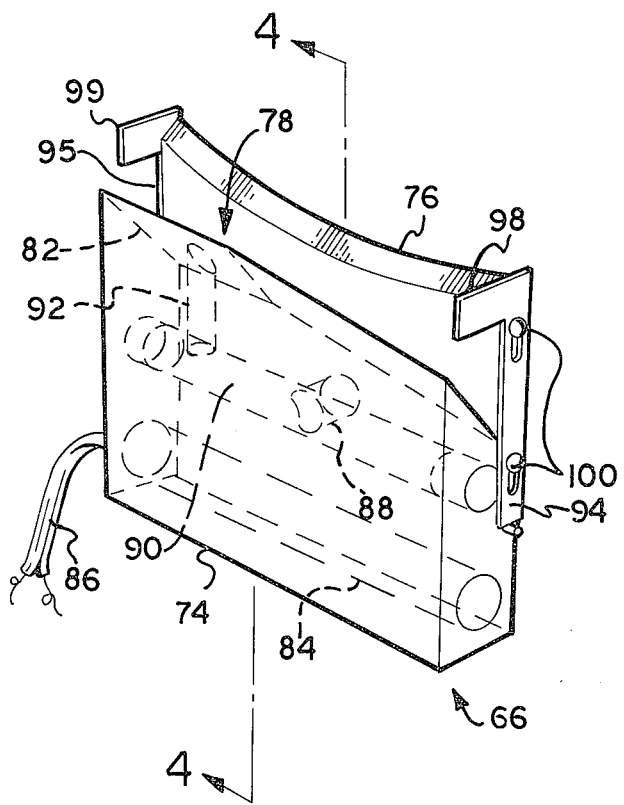
FIG. 3 is a perspective view of the material application head of the present invention.

The material application head 66 is shown in detail in FIGS. 3 and 4. Preferably, the application head 66 is made from a solid main body member 74. At the edge of the main body member 74 which is adjacent to the shoulder portion 30 of the glass container to be coated, a doctoring edge or doctor edge 76 is formed. The doctor edge 76 is formed by cutting back a portion of the top of the main body member 74 at an angle of about 15° to 30°, designated as angle X in FIG. 4, downwardly from the horizontal, as best seen in FIG. 4. The doctor edge 76 is also preferably curved, the radius of curvature corresponding to the radius of curvature of the shoulder portion 30 which is to be coated, or of any other localized region which is to be coated or completely encircled. Behind the doctor edge 76 and immediately adjacent thereto is formed a material well 78 which serves as a reservoir for the fluid organic polymeric material. As seen in FIG. 3 and 4, the material well 78 is defined by a substantially vertical front wall 80 and a sloping rear wall 82. The front wall 80 and the rear wall 82 are connected at the bottom to give a substantially triangular shape to the material well 78. The precise shape of the material well 78 is not a critical factor under most operating conditions, but could require some modification if the speed of operation of the application head 66 is too slow or too fast. That is, at extremely slow speeds of operation it is necessary to slope the material well 78 along the length of the doctor edge 76 in order to allow a faster flow of the fluid organic polymeric material downward off the doctor edge 76 to prevent material buildup on the lower edge thereof. It should be realized that this occurs when the material application head 66 is, as is shown in FIGS. 1 and 2, in its normal position for application of the fluid material to the glass container 28. In this position, the fluid material normally has a tendency to flow downwardly away from the material outlet. However, the application head 66 as shown in FIGS. 3 and 4 in an upright position, so this function is not necessarily apparent in these figures. At relatively high rates of material application, the configuration of the material well 78 shown in FIGS. 3 and 4 is quite satisfactory. When using a molten thermoplastic type material, the application head 66 also preferably includes a cartridge-type heater 84 which is inserted in an opening that extends completely through the application head 66. The cartridge heater has an electrical lead line 86 connected thereto which itself is connected to a suitable source of electrical power. This provides a means in the application head 66 to maintain a molten thermoplastic material in a completely molten condition and prevent premature solidification of the molten thermoplastic material. The organic polymeric material enters the application head 66 through an entrance passageway 88. The entrance passageway 88 then connects with a distribution passageway 90. The distribution passageway 90 then connects with a material outlet passage 92 which is opened to the sloping rear wall 82. Thus, the organic polymeric material enters through the entrance passageway 88 proceeds along the distribution passageway 90 and finally enters the material well 78 through the material outlet passage 92. Note that in FIGS. 1 and 2 the material outlet passage 92 is on the uphill or higher side of the application head 66 when it is mounted in its operational position. Thus, the fluid material which exits into the material well 78 is closer to the upper edge of the doctor edge 76 than to the lower edge. The flow rate of the fluid material to the application head 66 is sufficient to maintain the material well 78 in a substantially full or slightly overflowing condition, such that the fluid material reaches up to the level of the extreme upper edge of the doctor edge 76. This ensures that sufficient material is present to give an even and uniform coating on the shoulder portion 30 of the glass container. Two L-shaped stop members 94 and 95 are attached to the main body member 74 at a position adjacent to the doctor edge 76. The stop members 94 and 95 could be made an integral part of the main body member 74 if desired. Each of the stop members 94 and 95 have foot portions respectively designated as 98 and 99 which extend from the doctor edge 76 toward the material well 78. These foot portions 98 and 99 serve two important functions. First, the foot portions 98 and 99 have their extreme upper edges extendig above the edge of the doctor edge 76 a distance in the order of ten to 15 thousandths of an inch. It is this extension above the doctor edge 76 which in large part controls the thickness of the coating or film which is placed on the localized region, in this case the shoulder portion 30, of the glass container. This coating is typically in the range of six to 12 thousandths of an inch, and the doctor edge 76 never touches the surface of the glass container 28. The uppermost edges of the foot portions 98 and 99 actually ride on the surface of the glass container 28 and thus dictate how much material may pass between the doctor edge 76 and the actual surface of the glass container 28. There does not appear to be a direct one-to-one correlation between the amount the foot portions 98 and 99 project above the doctor edge 76 and the actual thickness of the coating on the glass container 28. However, there is a general correlation so that one may say that for a projection of approximately 15 thousandths of an inch above the doctor edge 76, the coating on the glass contaner 28 will be in a range of 12 thousandths of an inch. It may be necessary under some conditions to allow the downhill portion, which in the example shown would be the foot portion 98, to project slightly higher than the uphill foot portion, or vice versa, to compensate for small changes in the general shape of the container shoulder radius. The second function served by the foot portions 98 and 99 is to prevent the formation of accentuated ridges at perimeters of the actual coating put on the shoulder portion 30. Were the foot portions 98 and 99 not present, fluid organic polymeric material could creep around the upper edges of the doctor edge 76 and thus form undesirable ridges at the top and/or bottom edges of the coating on the glass container 28. This would result since the fluid material is relatively viscous and once flow is stated it will tend to follow a path it has started. Once the flow around the edge has begun it will be accentuated as the glass container 28 is rotated since there is a tendency for the material to continue to follow this path once begun. This is especially true if the glass container 28 is rotated through more than one complete revolution while being coated. The foot portions 98 and 99 block flow around the edge of the doctor edge 76 and thus inhibit formation of these ridges. If ridges are formed, they are relatively minor in extent compared to those which are formed when the foot portions 98 and 99 are omitted. It may be noted in FIG. 3 that the stop members 94 and 95 are mounted on the main body member 74 with screws such as those designated as 100, thus allowing adjustment of the precise position of the foot portions 98 and 99 above the doctor edge 76.

In FIG. 5, a slightly modified material application head 66' is shown. The application head 66' has a material well 78' of a different configuration and also includes a slot-type outlet 93 which connects with a distribution passageway 90', which is identical in function with the passageway 90 described with respect to FIG. 3. The slot-type outlet passage 93 is particularly designed for use in higher speed operations. This design allows a faster flow of the fluid material into the material well 78' than does the single outlet passage design described with respect to FIG. 3. In practice, either type of design can be made to work through a wide range of application speeds, but the slot design is particularly preferred at extremely high rates of operation.

Figure 6:
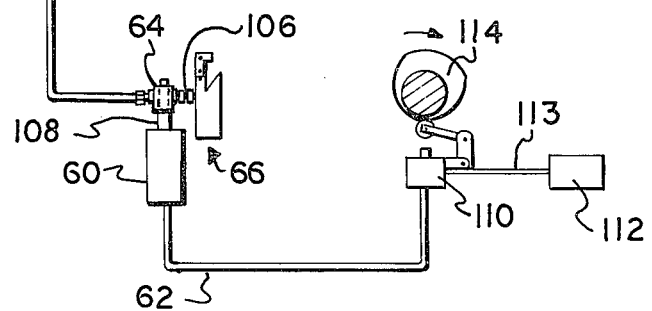
FIG. 6 is a schematic drawing of the control system of the present invention.

In FIG. 6, a schematic drawing of the control system of this invention is shown. In FIG. 6, a suitable drive means 102 drives a material supply unit 104, which may include a pump, into which the material is placed for delivery to the application head 66. In the case of a thermoplastic material, the material supply unit 104 also includes a suitable system for melting the material so used and placing it into a fluid state. The organic polymeric material is then forced through the line 68 to the mounting block 64 where a rigid line 106 feeds the fluid material into the application head 66. Also in FIG. 6, a previously mentioned operating rod 108 for the fluid motor 60 may be seen as carrying the mounting block 64. A mechanically operated normally closed fluid valve 110 is connected to a source of fluid under pressure 112 by a suitable pipe line 113. A cam 114 is driven in synchronism with the machine cycle. The profile of the cam 114 is cut such that for each rotation of the cam 114 the valve 110 is opened for a period of time during the cycle sufficient to allow the glass container 28 to rotate at least 360° while the application head 66 is held adjacent to the localized region to be coated and is closed for the rest of the cycle. Thus, as each glass container 28 is moved into the position as shown in FIG. 1, the cam 114 will rotate to open the valve 110 thus allowing the fluid under pressure to flow through the pipe line 62 connected to the valve 110 and then into the fluid motor 60 thereby causing an extension of the operating rod 108 and movement of the application head 66 adjacent to the glass container 28. This motion then allows the film or coating of the organic polymeric material to be formed on the localized region of the glass container 28 as the glass container 28 is rotated.

Figure 7:
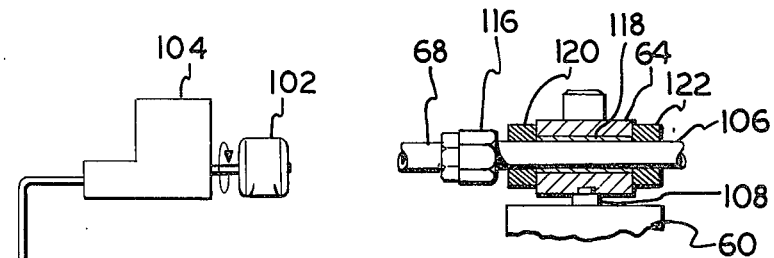
FIG. 7 is a cross-sectional elevational view, on an enlarged scale, of the connection of the material feed lines to the application head.

The detailed view of FIG. 7 shows the actual connection of the feed line 68 to the mounting block 64. As is apparent, the feed line 68 is connected to the line 106 to the application head 66 through a conventional flared fitting 116. The connection line 106 passes through a sleeve bearing 118 held in the mounting block 64. End stops 120 and 122 hold the bearing 118 in position. The fitting 116 is normally left slightly loose. This arrangement does allow some material to leak, but it also allows the line 106 to rotate slightly on the bearing 118. Since the application head 66 is attached to the connection line 106, the head 66 may also rotate. The head 66 can thus move along the axis of the fluid motor 60, since the fluid pressure and the spring force in the fluid motor 60 are in balance, and can also pivot somewhat. This allows the head 66 to track the surface of the bottle 28 as it changes positions slightly during rotation due to small surface irregularities.

Figure 8:
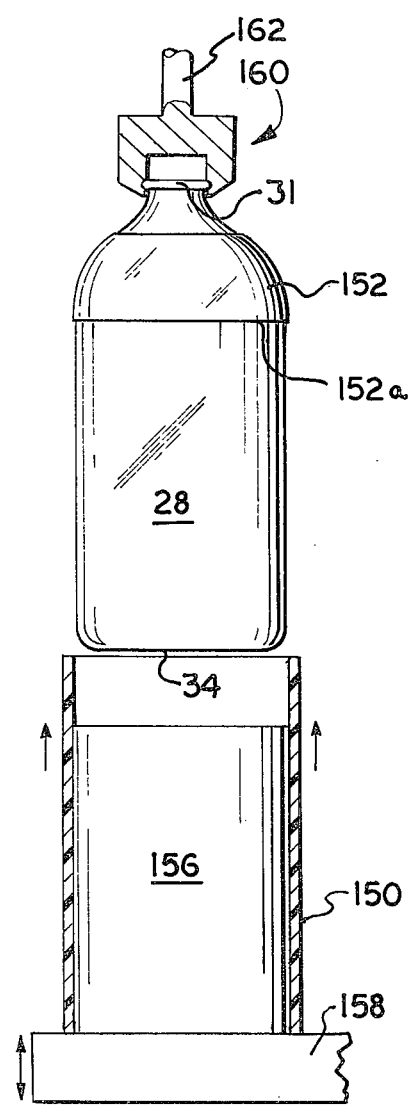
FIG. 8 is a schematic view of the application of a body-enclosing sleeve to a glass container coated in accordance with the present invention.

In FIG. 8, the assembly of a sleeve 150 of a plastic material onto a glass container 28 having its shoulder portion 30 coated in accordance with the present invention is illustrated. The assembly procedure for the sleeve 150 is illustrated in U.S. Pat. No. 3,767,496, the teachings of which are hereby incorporated by reference. As may be seen in FIG. 8, a coating of orgaic polymeric material 152 which completely encircles the shoulder portion has been placed on the glass container 28. It should be kept in mind again that the coating of the shoulder portion 30 only is simply by way of illustration and in general one should speak of completely encircling a localized region of the glass container. The sleeve 150 may be of a seamless variety cut from a tube of an oriented thermoplastic. The orientation of the plastic is predominantly in the circumferential dimension of the tube so that upon subsequent application of heat the sleeve will shrink radially (very little if any axial shrinkage will occur) about the bottle. The sleeve 150 has an internal diameter that is slightly greater than the outer diameter of the bottle glass container 28. The axial length of the sleeve 150 may be in exces of the distance from the lower margin 152a of the coating 152 to a bearing ring 154 on the bottom 34 of the glass container 28. The length of the sleeve 150 is preferably such that it will overlap the coating 152 and cover the body region, the heel region and an annular portion of the bottom 34 such as the bearing ring 154.

The sleeve 150 may also be formed into a tube from a rectangular sheet of heat shrinkable plastic material having the opposed side margins of the sheet overlapped on one another and seamed. In this form of sleeve, the plastic is highly oriented in a direction running from one side margin to the other so that when the sides are overlapped and seamed the resulting sleeve is highly oriented in the circumferential direction.

The sleeve 150, in either event, is substantially a hollow cylinder and is carried with its central axis vertically positioned on a mandrel 156. The mandrel 156 is attached to a support member and is encircled by a stripper ring 158 (shown in FIG. 8 in its lowermost position) connected to a mechanism (not shown) that is reciprocally driven vertically. Sleeve 150 over mandrel 156 is telescopically stripped and moved upwardly over the bottom end 34 of the glass container 28 by upward movement of the stripper ring 158 to a desired elevation until the upper edge of the sleeve 150 extends just beyond the lower margin 152a of the coating 152. The glass container 28 is held in a holder or chuck 160 which is attached to a central carrying shaft 162. The chuck 160 generally engages the neck portion 31 of the glass container 28. The glass container 28 with the sleeve 150 thereon is next taken to a heat treatment area, i.e., an oven chamber or an infra-red light bank, not shown, wherein the temperature is sufficient to shrink the sleeve 150 to a tight bottle conforming shape extending over the bottom end 34 to an overlapping portion 164 with the plastic coating 152. Note that, as previously explained, the overlapped portion 164 is not necessarily required. The sleeve 150 may be so sized as to just meet the bottom marginal edge 152a of the coating 152 or there may, in fact, be a gap between the sleeve 150 and the bottom marginal edge 152a. In any event, the net result is a glass container which has two contiguous regions completely enclosed; one with the localized coating of the present invention and the other with the contractable thermoplastic sleeve. A co-pending application, U.S. Pat. application Ser. No. 372,156, filed June 21, 1973, and having an assignee in common with the assignee of the present application, illustrates similar techniques for providing coatings on localized regions of glass containers and utilizing a sleeve such as the sleeve 150 to complete enclosure of the glass container. Reference is hereby made to this application and the teachings of this application are incorporated by reference to provide further examples of materials of the sleeve 150.

Figure 9:
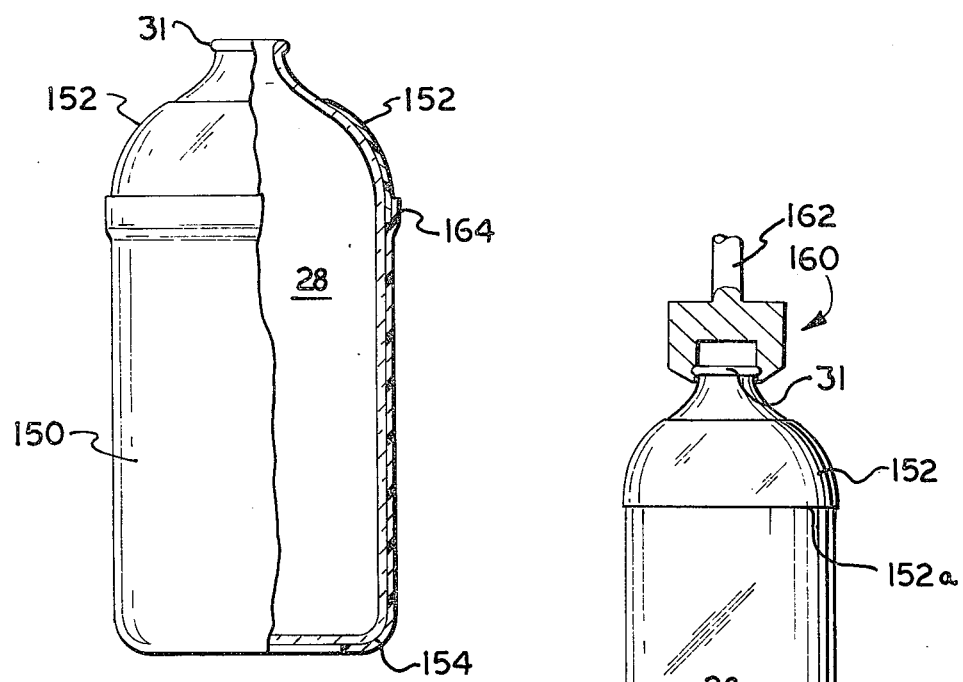
FIG. 9 is an elevational view, partially in cross-section, of a glass container having a coating in accordance with the present invention and a body-encompassing sleeve applied thereto.

The completed container is shown in FIG. 9. Note the overlapped region 164 between the shoulder coating 152 and the sleeve 150. This provides an enclosed glass container 28 which is thus extremely resistant to abrasions and thus allows maintenance of the original high strength values of the glass container 28 as formed.

What is claimed is:

1. A method for completely enclosing two contiguous regions of a glass container which comprises the steps of:
providing a reservoir having formed thereon a doctoring edge having a radius of curvature substantially corresponding to the radius of curvature of a first region of said glass container, said reservoir containing molten organic polymeric material extending said reservoir containing said molten material from a remote location to a location adjacent said first region of said glass container after said glass container is at a coating application station;
supplying molten organic polymeric material to said reservoir at a flow rate sufficient to maintain said reservoir in a substantially overflow condition at the time of extension from said remote location;
contacting said first region of said glass container with said overflowing organic polymeric material;
flowing said molten organic polymeric material directly from the reservoir onto said first region of said glass container and simultaneously doctoring said flowing material by moving said reservoir and said glass container relative to one another through 360° with respect to the circumference of said glass contaner while said glass container is in contact with said overflowing organic polymeric material to thereby cause said first region to be completely enclosed with a substantially uniform layer of said organic polymeric material;
retracting said reservoir to said remote location after said relative 360° movement has taken place;
placing a hollow tubular member of a contractable thermoplastic material around the second region of said glass container; and
contracting said thermoplastic tubular member into a snug fitting conforming engagement with said second region of said glass container to thereby completely enclose said second region.

2. The method of claim 1 wherein the step of placing a hollow tubular member around the second region includes the step of:
abutting said hollow tubular member with a marginal edge of said layer of organic polymeric material.

3. The method of claim 1 wherein the step of placing a hollow tubular member around the second region includes the step of:
overlapping a portion of a marginal edge of said layer of organic polymeric material with said hollow tubular member.

4. A method for enclosing a localized region of a glass container with a layer of an organic polymeric material which comprises the steps of:
providing a reservoir having formed thereon a doctoring edge having a radius of curvature subtantially corresponding to the radius of curvature of said localized region, said reservoir containing molten organic polymeric material;
positioning said reservoir containing said molten organic polymeric material in a location adjacent to said localized region;
supplying molten organic polymeric material to said reservoir at a flow rate sufficient to maintain said reservoir in a substantially overflow condition;
contacting a portion of said localized region of said glass container with said overflowing organic polymeric material;
flowing said molten organic polymeric material directly from the reservoir onto said localized region of said glass container by moving said reservoir and said glass container relative to one another through 360 degrees with respect to the circumference of said glass container while said glass container is in contact with said overflowing organic polymeric material;
simultaneously with the flow of organic polymeric material onto said localized region, doctoring said flowing organic polymeric material to thereby completely enclose said localized region with a substantially uniform layer of said organic polymeric material; and
retracting said reservoir to a location remote from said glass container after said relative 360° movement has taken place.

* * * * *